(12) United States Patent
Jang

(10) Patent No.: US 6,381,151 B1
(45) Date of Patent: Apr. 30, 2002

(54) HIGH EFFICIENCY SWITCHING CONTROLLER

(75) Inventor: Kyung-Oun Jang, Incheon (KR)

(73) Assignee: Fairfield Korea Semiconductor Ltd., Kyunkgi-do (KR)

( * ) Notice: Subject to any disclaimer, the term of this patent is extended or adjusted under 35 U.S.C. 154(b) by 0 days.

(21) Appl. No.: 09/643,534

(22) Filed: Aug. 22, 2000

(30) Foreign Application Priority Data

Oct. 6, 1999 (KR) ............................................. 99-43073

(51) Int. Cl.[7] ............................................. H02M 3/335
(52) U.S. Cl. .................................. 363/21.01; 363/21.11; 363/97; 363/131
(58) Field of Search ................................. 363/20, 21.01, 363/21.07, 21.09, 21.1, 21.11, 49, 97, 131

(56) References Cited

U.S. PATENT DOCUMENTS 5,844,378 A * 12/1998 LoCascio et al. ............ 315/307
6,087,782 A * 7/2000 Majid et al. ................. 315/224
6,118,675 A * 9/2000 Lionetto et al. ............... 363/49
6,125,046 A * 9/2000 Jang et al. ..................... 363/49

* cited by examiner

*Primary Examiner*—Peter S. Wong
*Assistant Examiner*—Gary L. Laxton
(74) *Attorney, Agent, or Firm*—Marshall, Gerstein, & Borun

(57) ABSTRACT

A high efficiency switching controller for use in a switching power supply (SPS) includes a current control device coupled to a voltage source of the SPS and a switch connected between the current control device and an output voltage circuit of the SPS. An under voltage lockout regulator coupled to the output voltage circuit of the SPS and the switch controls the state of the switch based on a voltage of the output voltage circuit and a bias unit coupled to the under voltage lockout regulator provides current to circuitry within the switching controller based on the voltage of the output voltage circuit. A protector within the high efficiency switching controller provides a control signal to the pulse width modulator unit to control the gate drive signal in response to an operating condition of the switching controller. Additionally, the control signal can periodically enable the pulse width modulator unit in response to a voltage of the output voltage circuit so that the gate drive signal includes groups of gate drive pulses.

14 Claims, 4 Drawing Sheets

HIGH EFFICIENCY SWITCHING CONTROLLER

BACKGROUND OF THE INVENTION

1. Field of the Invention

The invention relates generally to switching power supplies and, more particularly, the invention relates to a high efficiency switching controller for use in switching power supplies.

2. Description of Related Technology

Generally speaking, a switching power supply (SPS) provides a cost effective and energy efficient device for converting energy from a single direct current (DC) supply voltage into one or more DC output voltages that have a greater or lesser magnitude than the supply voltage. Traditionally, a SPS has an integrated control circuit that modulates the duty cycle of a transistor switch, which controls the flow of energy into the primary of a transformer to produce one or more desired output voltages that are derived from the secondary of the transformer. As is well known, the energy (i.e., the time integral of power) supplied to the primary of the transformer minus efficiency losses equals the energy transferred to the secondary of the transformer. Thus, if more energy is needed by the secondary, then the control circuit increases the duty cycle of the transistor switch to provide more energy to the primary of the transformer. Conversely, if less energy is needed by the secondary, then the control circuit decreases the duty cycle of the transistor switch.

FIG. 1 is an exemplary schematic block diagram of a conventional SPS, which includes a DC voltage supply block 10, a voltage output block 20, a feedback block 30, and a switching control circuit 40. The DC voltage supply block 10 includes a full wave bridge rectifier 1 and a filter capacitor C1. The bridge rectifier 1 rectifies alternating current (AC) line voltage to produce current pulses which are substantially smoothed to a DC supply voltage by the filter capacitor C1. For example, if the AC line voltage is 110 volts AC, then the smoothed DC supply voltage across capacitor C1 may be approximately 155 volts DC.

The output voltage block 20 includes a switching transformer 22 having a primary winding L1 and secondary windings L2 and L3 and switching rectifier diodes D5 and D6 that receive current pulses from the respective secondary windings L2 and L3 to provide rectified current pulses to respective filter capacitors C2 and C3. The filter capacitors C2 and C3 smooth the rectified current pulses to substantially DC voltages.

The feedback block 30 includes a feedback voltage amplifier 31 and a photo-coupler 32. The feedback voltage amplifier 31 detects the DC voltage across the filter capacitor C2 and provides a proportional current to the photo-coupler 32.

The switching control circuit 40 includes a pulse width modulated (PWM) signal generator 41, a switching transistor M1, a flyback diode D7, and a feedback capacitor C4. The switching transistor M1 is connected to the primary L1 of the transformer 22 and is switched on and off by the PWM signal generator 41 at a duty cycle that is based on the magnitude of a feedback voltage Vfb provided by the feedback capacitor C4.

Initially, when AC line voltage is first provided to the bridge rectifier 1, a supply voltage Vcc applied to the PWM signal generator 41 is substantially near zero volts DC and the PWM signal generator 41 is off. Additionally, because the PWM signal generator 41 is off, the switching transistor M1 is off, energy is not provided to the primary winding L1, and the output voltages across the filter capacitors C2 and C3 are substantially near zero volts DC.

As is generally known, the PWM signal generator 41 is typically fabricated using conventional integrated circuit technologies and requires a relatively low DC supply voltage, which may be, for example, between 4 volts DC and 12 volts DC. Typically, the low supply voltage required by the PWM signal generator 41 is derived from the output voltage block 20. Thus, as shown in FIG. 1, the supply voltage Vcc for the PWM signal generator 41 is provided by the voltage across the filter capacitor C3. Additionally, because the voltage across the filter capacitor C3 is initially substantially near zero volts DC, a start up resistor R is connected between the filter capacitors C1 and C3. The start up resistor R provides an initial charging current to the filter capacitor C3 that causes the voltage across the filter capacitor C3 to increase. When the voltage on the filter capacitor C3 reaches a level sufficient to cause the PWM signal generator 41 to begin functioning, the PWM signal generator 41 regulates the voltage across the filter capacitor C3 and the current flowing through the start up resistor R no longer increases the voltage across the filter capacitor C3.

Although the start up resistor R is needed to the start the operation of the PWM signal generator 41, the start up resistor R becomes a significant source of energy inefficiency once the PWM signal generator 41 is operational. More specifically, a large voltage differential exists across the start up resistor R because the difference between the output voltage of the DC voltage supply block 10 is substantially greater than the low voltage supply Vcc for the PWM signal generator 41. For example, the output voltage of the DC voltage supply block 10 may be 155 volts DC while the low voltage supply Vcc is about 5 volts DC. This large voltage drop across the start up resistor R during continuous operation of the SPS results in a significant source of energy inefficiency.

SUMMARY OF THE INVENTION

In accordance with one aspect of the invention, a high efficiency switching controller for use in a switching power supply having a voltage source, a transformer with a primary winding coupled to the voltage source and a secondary winding, a switching transistor coupled to the primary winding, an output voltage circuit coupled to the secondary winding, and a feedback circuit coupled to the output voltage circuit. The high efficiency switching controller includes a current control device coupled to the voltage source and a switch connected between the current control device and the output voltage circuit. The high efficiency switching controller may also include an under voltage lockout regulator coupled to the output voltage circuit and the switch that controls the state of the switch based on a voltage of the output voltage circuit.

The high efficiency switching controller may further include a bias unit coupled to the under voltage lockout regulator that provides current to circuitry within the switching controller based on the voltage of the output voltage circuit, a source/sink unit coupled to the feedback circuit, a first comparator coupled to the source/sink unit, an oscillator coupled to the first comparator, and a pulse width generator coupled to the oscillator and an output of the first comparator that generates a gate drive signal having a duty cycle based on an output of the feedback circuit.

Additionally, the high efficiency switching controller may include a protector coupled to the feedback circuit, the under voltage lockout regulator, and the pulse width generator and an adjuster coupled to the under voltage lockout regulator and the protector. The protector may provide a control signal to the pulse width generator that controls the gate drive signal in response to an operating condition of the switching controller. The operating condition of the switching controller may be associated with a thermal condition or, alternatively, may be associated with an excessive load on the switching controller. Also, the control signal may periodically enable the pulse width generator in response to a voltage of the output voltage circuit so that the gate drive signal includes groups of gate drive pulses.

The high efficiency switching controller may still further include a leading edge blanking unit coupled to the pulse width generator, a second comparator having a first input that monitors a current flowing through the switching transistor and a second input that receives a reference signal, and an AND gate coupled to the leading edge blanking unit, the second comparator, and the pulse width generator, whereby the AND gate provides a control signal to the pulse width generator that turns the gate drive signal off in response to an overcurrent condition in the switching transistor.

In accordance with another aspect of the invention, an integrated circuit high efficiency switching controller includes a current control device including a transistor that is coupled to a first terminal of the integrated circuit high efficiency switching controller, a switch connected between the current control device and a second terminal of the integrated circuit high efficiency switching controller, and an under voltage lockout regulator connected to the second output terminal and the current control device that controls the conduction of the current control device based on a voltage on the second terminal.

The invention itself, together with further objectives and attendant advantages, will best be understood by reference to the following detailed description, taken in conjunction with the accompanying drawings and the appended claims.

DETAILED DESCRIPTION OF THE PREFERRED EMBODIMENTS

The switching controller described herein uses active circuitry that enables a switching power supply to operate more efficiently. Generally speaking, the high efficiency switching controller described herein includes active circuitry that monitors a supply voltage of the switching controller to control the state of an internal switch so that start up currents are extinguished when the SPS achieves a normal operating condition (i.e., the output voltages of the SPS have reached regulation levels). More specifically, the internal switch is connected in series with a current control device between a relatively high voltage DC supply, which is derived from rectified line voltage, and the supply voltage of the switching controller. Upon initial power up (i.e., a period of time immediately following the application of AC power to the SPS), the supply voltage of the switching controller is substantially near zero volts and the internal switch is closed so that a charging current flows from the high voltage DC supply through the current control device to a supply voltage terminal of the switching controller. When the switching controller supply voltage exceeds a predetermined threshold level, the internal switch is opened so that current no longer flows through the current control device, thereby eliminating excess power dissipation within the SPS when the SPS achieves a normal operating condition.

Figure 1:
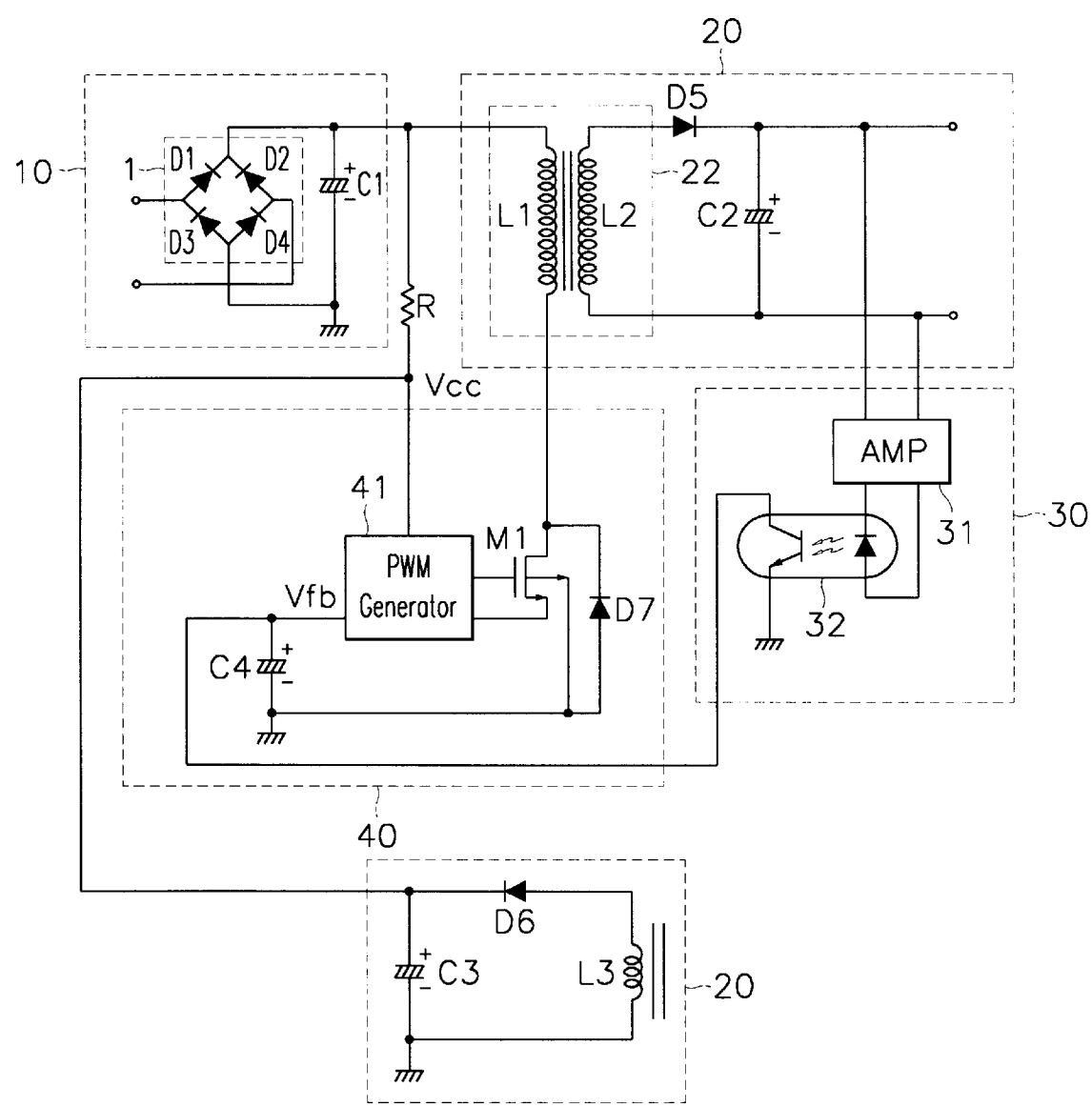
FIG. 1 is an exemplary schematic block diagram of a conventional switching power supply.
Figure 2:
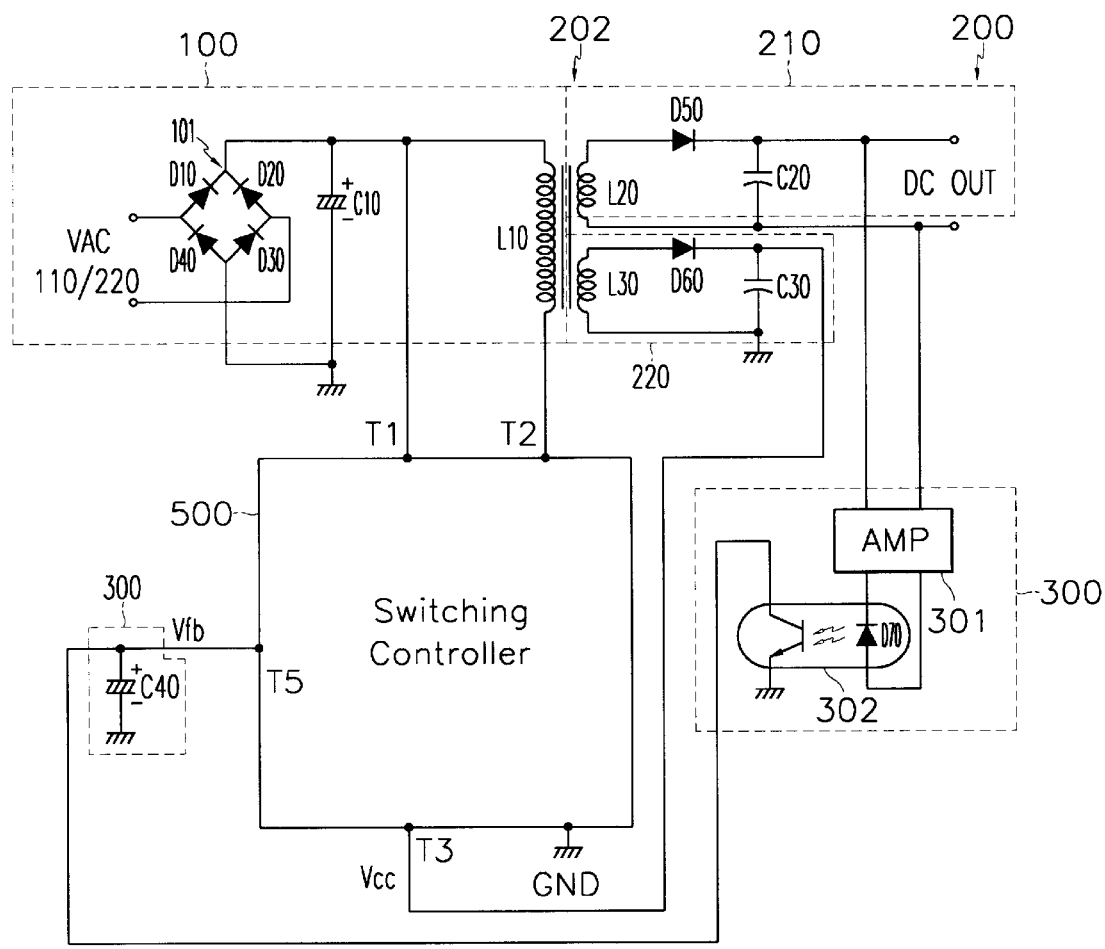
FIG. 2 is an exemplary schematic block diagram of a switching power supply having a high efficiency switching controller.

FIG. 2 is an exemplary schematic block diagram of a SPS having a high efficiency switching controller. The SPS includes a DC voltage supply block 100, an output voltage block 200, a feedback block 300, and a switching controller 500. The DC voltage supply block 100 includes a bridge rectifier 101 having rectifier diodes D10–D40 that provide rectified current pulses to a filter capacitor C10. As is generally known, the filter capacitor C10 smooths the current pulses from the bridge rectifier 101 to generate a substantially DC supply voltage.

The output voltage block 200 includes a transformer 202 having a primary winging L10 and secondary windings L20 and L30, switching rectifier diodes D50 and D60, and filter capacitors C20 and C30, all connected as shown. The output voltage block 200 has a first output portion 210, which includes the secondary winding L20, the switching rectifier diode D50, and the filter capacitor C20, and a second output portion 220, which includes the secondary winding L30, the switching rectifier diode D60, and the filter capacitor C30. The first and second output portions 210 and 220 may provide electrically isolated DC voltages that may be the same or different from one another and the same or different from the DC voltage supplied by the DC voltage supply block 100. As is known, the values for the DC voltages provided by the output portions 210 and 220 are primarily determined by the relative turns ratios of the secondary windings L20 and L30 and the primary winding L10.

The feedback block 300 includes a voltage feedback amplifier 301 and a photo isolator 302. The voltage feedback amplifier 301 detects the DC voltage provided by the first output portion 210 and provides a proportional current signal that drives the photo isolator 302. The photo isolator 302 receives a bias voltage from the DC output voltage of the first output portion 210 and converts this bias voltage into a charging current that is delivered to a feedback capacitor C40, whereby a feedback voltage Vfb is developed across the feedback capacitor C40.

Figure 3:
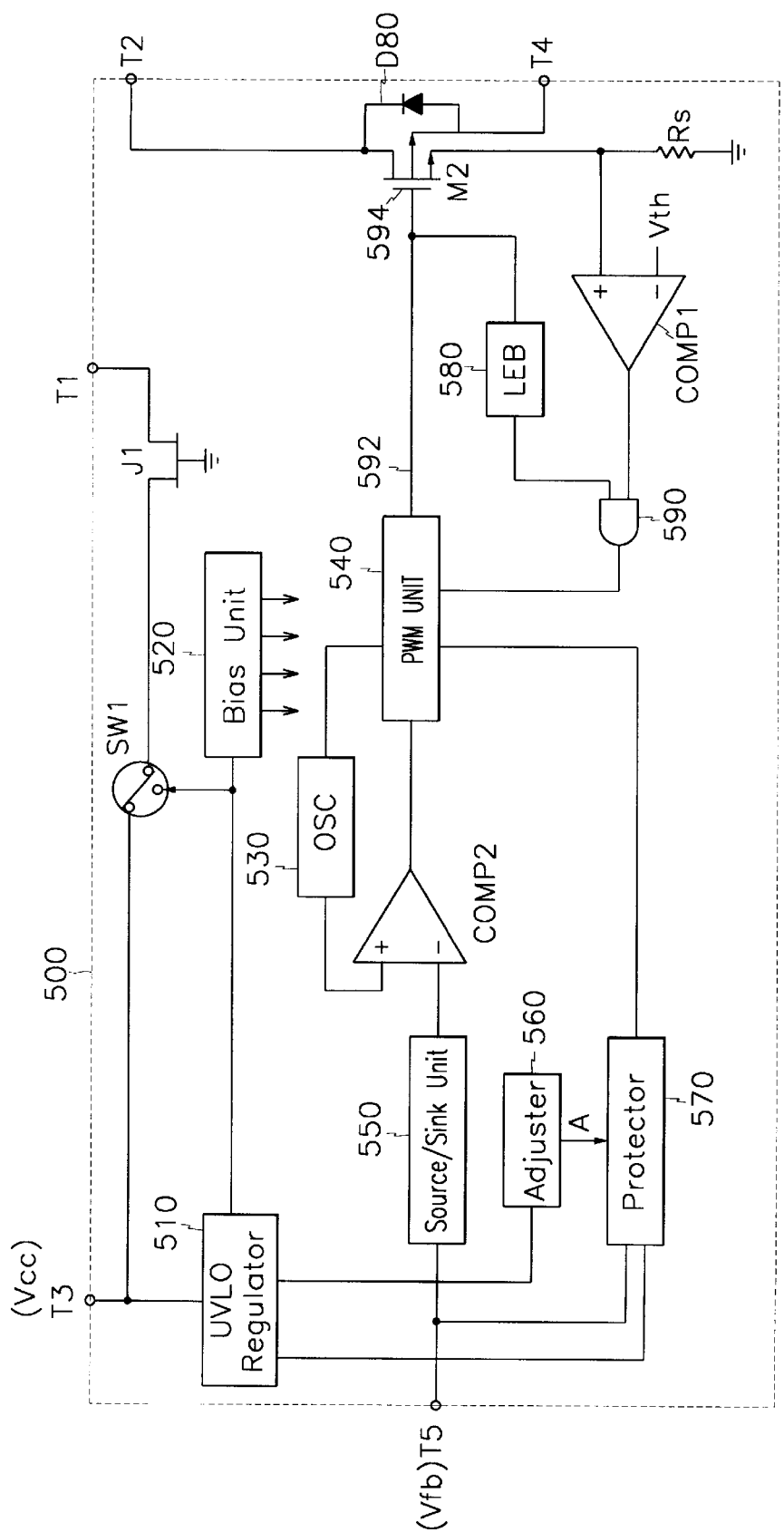
FIG. 3 is a more detailed schematic block diagram of the switching controller of FIG. 2.

FIG. 3 is a more detailed schematic block diagram of the switching controller 500 of FIG. 2. The switching controller 500 includes a junction field effect transistor (JFET) J1, a switch SW1, an undervoltage lockout (UVLO) regulator 510, a bias unit 520, an oscillator 530, a pulse width modulator (PWM) unit 540, a source/sink unit 550, an adjuster 560, a protector 570, a leading edge blanking (LEB) unit 580, comparators COMP1 and COMP2, an AND gate 590, a metal oxide semiconductor field effect transistor (MOSFET) M2, a current sense resistor Rs and a flyback diode D80, all connected as shown. The JFET J1 and the switch SW1 are connected in series between terminal T1, which is coupled to the rectified DC supply voltage across the filter capacitor C10, and terminal T3, which is the supply voltage Vcc of the switching controller 500 that is provided by the second output portion 220. When the switch SW1 is in a closed condition, a charging current flows from the terminal T1 through the JFET J1 and the switch SW1 to the terminal T3, thereby increasing the voltage on the filter capacitor C30. On the other hand, when the switch SW1 is in an open condition, no current flows through the JFET J1 or the switch SW1 and the filter capacitor C30 may only receive charging currents via the switching rectifier diode D60.

As is commonly known, because the gate terminal of the JFET J1 is connected to a reference or ground potential, the JFET J1 functions as an active resistance to control the current passing through the JFET J1 and the switch SW1. In this manner, the JFET J1 prevents the circuitry of the switching controller 500 from receiving excessive currents. Additionally, those of ordinary skill in the art will recognize that while a JFET (such as the JFET J1) may be used as a current control device within the switching controller 500, other types of current control devices such as a large value resistor, an active current source, etc. may be used without departing from the scope of the invention.

The UVLO regulator 510 monitors the supply voltage terminal T3 of the switching controller 500 and provides control signals to the switch SW1, the bias unit 520, the adjuster 560 and the protector 570. When the supply voltage Vcc on the terminal T3 is less than a predetermined level, the UVLO regulator 510 provides a control signal to the switch SW1 and the bias unit 520 so that the switch SW1 is closed, which causes a charging current to flow from the terminal T1 to the terminal T3 and the bias unit 520 is disabled or off. When the supply voltage Vcc exceeds the predetermined level, the UVLO regulator 510 provides a control signal that turns the switch SW1 off so that no current flows between the terminals T1 and T3 and that turns the bias unit 520 on so that bias currents are supplied to circuitry within the switching controller 500. The UVLO regulator 510 also supplies a clock signal, which is depicted in graph (a) of FIG. 4 and which is described in greater detail below, to the source/sink unit 550 and the protector 570 when the supply voltage Vcc on terminal T3 is below a low reference voltage VccL or when the supply voltage Vcc is above a high reference voltage VccH.

The bias unit 520, when enabled by the control signal from the UVLO regulator 510, provides bias currents to the circuitry within the switching controller 500. The bias unit 520 may use any conventional active or passive circuitry that supplies a substantially constant current independent of the level of the supply voltage Vcc.

The oscillator 530, the PWM unit 540, the comparator COMP2 and the source/sink unit 550 cooperate to modulate the duty cycle of a gate drive signal 592 which is applied to a gate terminal 594 of the MOSFET M2 based on the feedback voltage Vfb on terminal T5 of the switching controller 500. In general, the PWM unit 540 functions in a conventional manner to increase the duty cycle of the gate drive signal 592 when the feedback voltage Vfb indicates that the regulated output voltage of the SPS has fallen below a desired level and to decrease the duty cycle of the gate drive signal 592 when the feedback voltage Vfb indicates that the regulated output voltage of the SPS is greater than a desired level.

Figure 4:
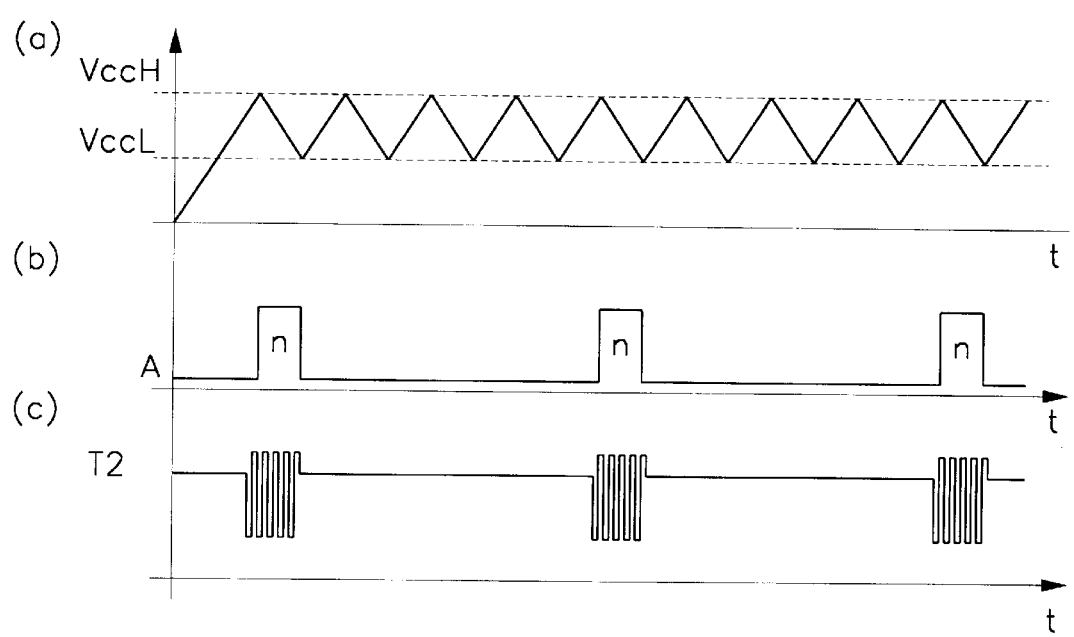
FIG. 4 is a graphical representation of signals associated with the switching controller of FIGS. 2 and 3.

The protector 570 receives the clock signal provided by the UVLO regulator 510, the feedback voltage Vfb, and a gating signal A that is generated by the adjuster 560 and which is shown in graph (b) of FIG. 4. The protector 570 protects the MOSFET M2 when the output of the first and/or second output portions 210 and 220 are excessive or when a thermal overload is detected within the SPS.

When the protector 570 detects an excessive feedback voltage Vfb, the protector 570 outputs a signal to disable the PWM unit 540, thereby preventing any current from flowing through the MOSFET M2. Additionally, when the supply voltage Vcc exceeds the upper reference voltage VccH or falls below the lower reference voltage VccL, the UVLO regulator 510 outputs the clock signal shown in graph (a) of FIG. 4 to the protector 570 and the adjuster 560. The adjuster 560 then supplies the gating signal A shown in graph (b) of FIG. 4 to the protector 570 which then enables the PWM unit 540 during the intervals in which the gating signal is at a logical high level (i.e., the PWM unit 540 is gated on and off). While enabled, the PWM unit 540 produces a plurality of gate pulses (which correspond to a plurality of clock cycles of the oscillator 530) to switch the MOSFET M2.

The current sense resistor Rs, the comparator COMP1, the LEB unit 580 and the AND gate 590 cooperate to protect the MOSFET M2 from excessive currents. When the current flowing through the MOSFET M2 exceeds a safe operating level, the voltage across the current sense resistor Rs, which is applied to a non-inverting terminal of the comparator COMP1, exceeds a threshold voltage Vth that is applied to an inverting terminal of the comparator COMP1. As a result, the output of the comparator COMP1 transitions to a logical high level when the current flowing in the MOSFET M2 exceeds the desired safe level. The LEB unit 580 provides a blanking pulse to the AND gate 590 for a predetermined period of time at the beginning of each switching interval of the MOSFET M2. In this manner, the LEB unit 580 prevents false triggering of the output of the AND gate 590 that would otherwise result from current spikes that flow through the MOSFET M2 and the current sense resistor Rs at the beginning of each switching interval of the MOSFET M2. If, following the blanking interval, the current flowing through the current sense resistor Rs exceeds the desired maximum level, the output of the AND gate 590 transitions to a logical high level to disable the PWM unit 540.

The above-described high efficiency switching controller may be fabricated using discrete circuit components or may be substantially or completely integrated using conventional integrated circuit technologies. Alternatively, the switching controller may be fabricated as a hybrid circuit having any desired combination of integrated circuit components and discrete circuit components without departing from the scope of the invention.

A range of changes and modifications can be made to the preferred embodiment described above. The foregoing detailed description should be regarded as illustrative rather than limiting and the following claims, including all equivalents, are intended to define the scope of the invention.

What is claimed is:

1. A high efficiency switching controller for use in a switching power supply having a voltage source, a transformer with a primary winding coupled to the voltage source and a secondary winding, a switching transistor coupled to the primary winding, an output voltage circuit coupled to the secondary winding, a feedback circuit coupled to the output voltage circuit, the high efficiency switching controller comprising:

a current control device coupled to the voltage source;

a switch connected between the current control device and the output voltage circuit;

an under voltage lockout regulator that controls the state of the switch based on a voltage of the output voltage circuit a source sink unit coupled to the feedback circuit;

a first comparator coupled to the source/sink unit;

an oscillator coupled to the first comparator; and a pulse width modulator unit that generates a gate drive signal having a duty cycle based on an output of the feedback circuit.

2. The high efficiency switching controller of claim 1, further comprising a bias unit coupled to the under voltage lockout regulator that provides current to circuitry within the switching controller based on the voltage of the output voltage circuit.

3. The high efficiency switching controller of claim 1, further comprising an overload protector coupled to the feedback circuit, the under voltage lockout regulator, and the pulse width modulator unit and a restart adjuster coupled to the under voltage lockout regulator and the protector, wherein the overload protector provides a control signal to the pulse width modulator unit that controls the gate drive signal in response to an operating condition of the switching controller.

4. The high efficiency switching controller of claim 3, wherein the operating condition of the switching controller is a thermal condition.

5. The high efficiency switching controller of claim 3, wherein the operating condition of the switching controller is associated with an excessive load on the switching controller.

6. The high efficiency switching controller of claim 3, wherein the control signal periodically enables the pulse width modulator unit in response to a voltage of the output voltage circuit so that the gate drive signal includes groups of gate drive pulses.

7. The high efficiency switching controller of claim 1, further comprising:

a leading edge blanking unit coupled to the pulse width modulator unit;

a second comparator having a first input that monitors a current flowing through the switching transistor and a second input that receives a reference signal, and an AND gate coupled to the leading edge blanking unit, the second comparator, and the pulse width modulator unit, wherein the AND gate provides a control signal to the pulse width modulator unit that turns the gate drive signal off in response to an overcurrent condition in the switching transistor.

8. An integrated circuit high efficiency switching controller, comprising;

a current control device coupled to a first terminal of the integrated circuit high efficiency switching controller;

a switch connected between the current control device and a second terminal of the integrated circuit high efficiency switching controller;

an under voltage lockout regulator connected to the second terminal and the current control device that controls the conduction of the current control device based on a voltage on the second terminal;

a source/sink unit coupled to a third terminal of the integrated circuit high efficiency switching controller;

a first comparator coupled to the source/sink unit;

an oscillator coupled to the first comparator; and a pulse width modulator unit that generates a gate drive signal having a duty cycle based on an output of the feedback circuit.

9. The integrated circuit high efficiency switching controller of claim 8, further comprising a bias unit coupled to the under voltage lockout regulator that provides current to circuitry within the integrated circuit high efficiency switching controller based on the voltage on the second terminal.

10. The integrated circuit high efficiency switching controller of claim 8, further comprising an overload protector coupled to the feedback circuit, the under voltage lockout regulator, and the pulse width modulator unit and a restart adjuster coupled to the under voltage lockout regulator and the protector, wherein the overload protector provides a control signal to the pulse width modulator unit that controls the gate drive signal in response to an operating condition of the integrated circuit high efficiency switching controller.

11. The integrated circuit high efficiency switching controller of claim 10, wherein the operating condition of the integrated circuit high efficiency switching controller is a thermal condition.

12. The integrated circuit high efficiency switching controller of claim 10, wherein the operating condition of the integrated circuit high efficiency switching controller is associated with an excessive load on the integrated circuit high efficiency switching controller.

13. The integrated circuit high efficiency switching controller of claim 10, wherein the control signal periodically enables the pulse width modulator unit in response to a voltage of the output voltage circuit so that the gate drive signal includes groups of gate drive pulses.

14. The integrated circuit high efficiency switching controller of claim 11, further comprising:

a leading edge blanking unit coupled to the pulse width modulator unit;

a second comparator having a first input that monitors a current flowing through the switching transistor and a second input that receives a reference signal; and an AND gate coupled to the leading edge blanking unit, the second comparator, and the pulse width modulator unit, wherein the AND gate provides a control signal to the pulse width modulator unit that turns the gate drive signal off in response to an overcurrent condition in a switching transistor.

* * * * *